(12) United States Patent
Ishihara

(10) Patent No.: US 7,958,672 B2
(45) Date of Patent: Jun. 14, 2011

(54) OPENING/CLOSING DEVICE

(75) Inventor: Hidenori Ishihara, Hamamatsu (JP)

(73) Assignee: ASMO Co., Ltd., Shizuoka-ken (JP)

( * ) Notice: Subject to any disclaimer, the term of this patent is extended or adjusted under 35 U.S.C. 154(b) by 972 days.

(21) Appl. No.: 11/815,357

(22) PCT Filed: Mar. 22, 2006

(86) PCT No.: PCT/JP2006/305661
§ 371 (c)(1),
(2), (4) Date: Aug. 2, 2007

(87) PCT Pub. No.: WO2006/101109
PCT Pub. Date: Sep. 28, 2006

(65) Prior Publication Data
US 2009/0100755 A1    Apr. 23, 2009

(30) Foreign Application Priority Data
Mar. 22, 2005   (JP) ................................. 2005-082202

(51) Int. Cl.
*E05F 15/02*   (2006.01)
(52) U.S. Cl. ................... 49/26; 49/27; 200/61.43
(58) Field of Classification Search ............... 49/26, 27, 49/28, 360; 200/61.43; 296/155
See application file for complete search history.

(56) References Cited

U.S. PATENT DOCUMENTS

| | | | | |
|---|---|---|---|---|
| 5,023,418 A | * | 6/1991 | Beckhausen | 200/511 |
| 5,079,417 A | * | 1/1992 | Strand | 250/221 |
| 5,166,586 A | * | 11/1992 | Yaguchi | 318/434 |
| RE34,665 E | * | 7/1994 | Strand | 250/221 |
| 5,921,026 A | * | 7/1999 | Miller | 49/27 |
| 6,339,305 B1 | * | 1/2002 | Ishihara et al. | 318/445 |
| 6,683,296 B2 | * | 1/2004 | Miller et al. | 250/221 |
| 7,000,352 B2 | * | 2/2006 | Ishihara et al. | 49/28 |
| 7,015,666 B2 | * | 3/2006 | Staus | 318/286 |
| 7,116,117 B2 | * | 10/2006 | Nakano et al. | 324/688 |
| 7,545,153 B2 | * | 6/2009 | Abe | 324/663 |

(Continued)

FOREIGN PATENT DOCUMENTS
JP         11-72395 A        3/1999
(Continued)

*Primary Examiner* — Jerry Redman
*Assistant Examiner* — Catherine A Kelly
(74) *Attorney, Agent, or Firm* — Marsh Fischmann & Breyfogle LLP

(57) ABSTRACT

A conductive movable body opens and closes an opening portion formed in a conductive opening forming body. The movable body has a front edge portion positioned in a front side in the closing direction of the movable body. The opening portion has an opposed edge portion opposed to the front edge portion. The sensor is arranged in a layout body corresponding to one of the opening forming body and the movable body, and is arranged in one of the front edge portion and the opposed edge portion. The sensor is capable of detecting a conductive object-to-be-detected on the basis of a change of a capacitance between a sensor electrode and the object-to-be-detected coming close to the sensor electrode. A guard electrode is provided between the layout body and the sensor electrode. An electric potential of the guard electrode is kept equal to an electric potential of the sensor electrode or kept at a fixed rate with respect to the electric potential of the sensor electrode. Accordingly, it is possible to prevent an improper operation of a capacitance type sensor in the opening and closing apparatus.

10 Claims, 10 Drawing Sheets

U.S. PATENT DOCUMENTS

| | | |
|---|---|---|
| 2003/0080755 A1 | 5/2003 | Kobayashi |
| 2004/0172879 A1* | 9/2004 | Regnet et al. ............... 49/26 |
| 2006/0191203 A1* | 8/2006 | Ueda et al. ............... 49/27 |
| 2009/0100755 A1 | 4/2009 | Ishihara |

FOREIGN PATENT DOCUMENTS

| | | |
|---|---|---|
| JP | 11-191339 | 7/1999 |
| JP | 11-191339 A | 7/1999 |
| JP | 11-210320 | 8/1999 |
| JP | 2000-065653 A | 3/2000 |
| JP | 2001-135700 | 5/2001 |
| JP | 2003-202383 | 7/2003 |
| JP | 2004-059343 A1 | 7/2004 |
| JP | 2004-257788 | 9/2004 |
| WO | 2006/101109 A1 | 9/2006 |

* cited by examiner

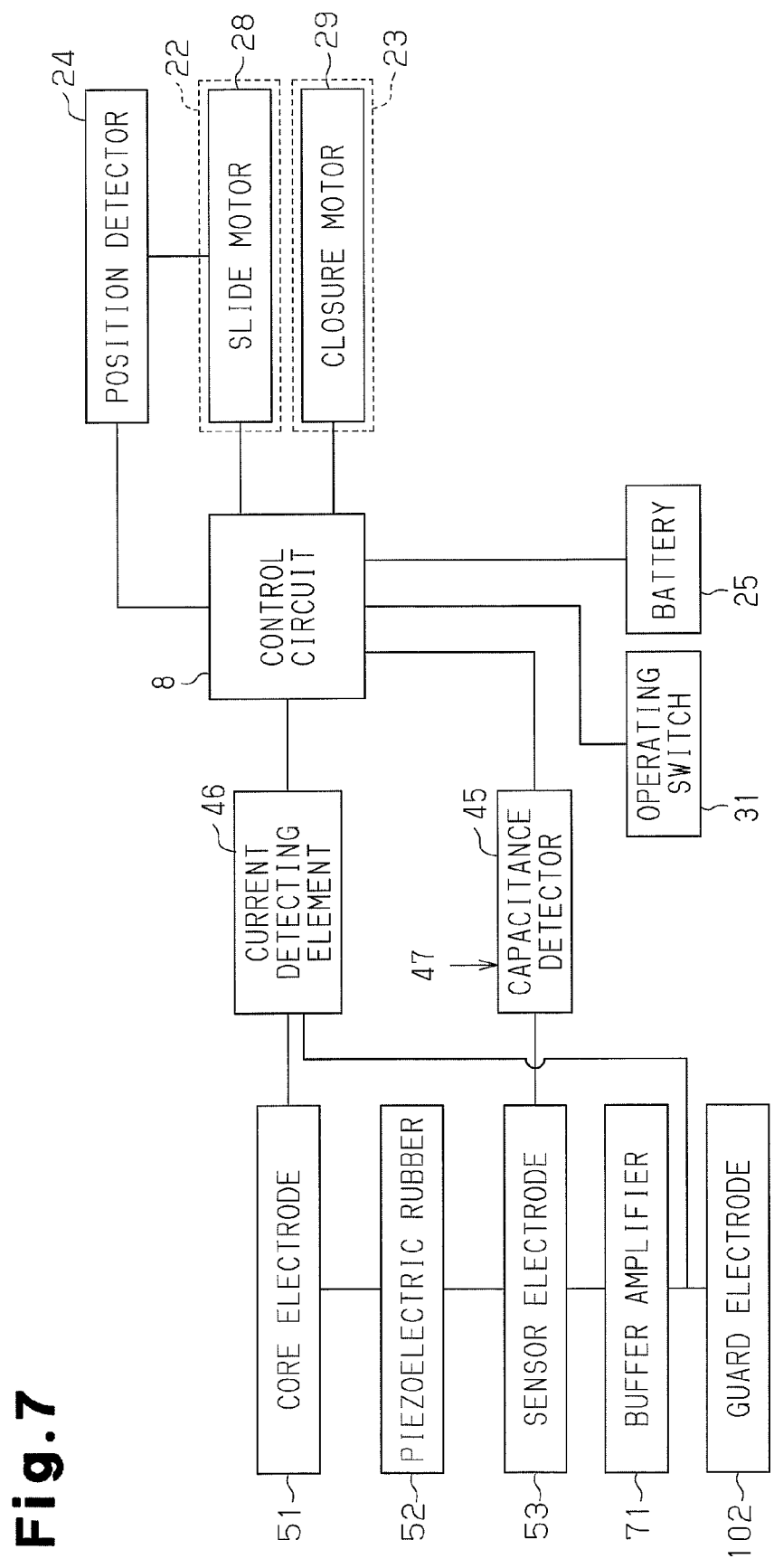

OPENING/CLOSING DEVICE

FIELD OF THE INVENTION

The present invention relates to an opening and closing apparatus.

BACKGROUND OF THE INVENTION

Conventionally, there has been a vehicle provided with an opening and closing apparatus sliding (operating to open and close) a door panel along a longitudinal direction of the vehicle on the basis of a driving force of a motor or the like. The opening and closing apparatus is provided with a sensor detecting an existence of a foreign material between the door panel under a closing motion and a vehicle body. The sensor employs a structure disclosed in Patent Document 1.

The sensor disclosed in the publication mentioned above is provided, for example, with a sensor electrode arranged in a front end portion of the door panel. If a foreign material exists between the door panel and the vehicle body under the closing motion of the door panel, a capacitance detected by the sensor electrode is changed. A control apparatus determines that the foreign material exists between the door panel and the vehicle body on the basis of the change of the capacitance, and moves the door panel to a full-open position on the basis of the driving force of the motor or the like. As mentioned above, the sensor executes a pinching detection, and detects the foreign material existing between the door panel and the vehicle body in a non-contact manner.

However, in the sensor disclosed in the publication mentioned above, a first stray capacitance is generated between the sensor electrode and the door panel, and if the foreign material comes close to the door panel from an outer side of the door panel, a second stray capacitance is generated between the foreign material and the door panel. The second stray capacitance is coupled to the first stray capacitance in parallel via the door panel. Accordingly, even if the foreign material does not get into the portion between the door panel and the vehicle body, the capacitance detected by the sensor electrode is changed. Accordingly, for example, if a person comes close to the door panel from an outer side of the door panel, there is a risk that the control apparatus erroneously detects that a foreign material exists between the door panel and the vehicle body so as to stop the door panel under the closing operation or drive the door panel to the full-open position.

Patent Document 1: Japanese Laid-Open Patent Publication No. 2004-257788

SUMMARY OF THE INVENTION

An objective of the present invention is to provide an opening and closing apparatus that can prevent an erroneous operation of a capacitance type sensor.

In order to achieve the objective mentioned above, the present invention provides an opening and closing apparatus having a conductive movable body. The movable body is movable in a closing direction and an opening direction opposite to the closing direction so as to open and close an opening portion formed in a conductive opening forming body. The movable body has a front edge portion positioned in a front side in the closing direction of the movable body. The opening portion has an opposed edge portion opposed to the front edge portion. The sensor is arranged in a layout body corresponding to one of the opening forming body and the movable body. The sensor is arranged in one of the front edge portion and the opposed edge portion. The sensor has a sensor electrode. The sensor is capable of detecting a conductive object-to-be-detected on the basis of a change of the capacitance between the sensor electrode and the object-to-be-detected coming close to the sensor electrode. A guard electrode is provided between the layout body and the sensor electrode. The guard electrode is electrically connected to the sensor electrode. An electric potential of the guard electrode is kept equal to an electric potential of the sensor electrode or kept at a fixed rate with respect to the electric potential of the sensor electrode.

BRIEF DESCRIPTION OF THE DRAWINGS

FIG. 7 is a block diagram showing an electric configuration of a foreign material detecting portion in FIG. 6A;

DETAILED DESCRIPTION OF THE PREFERRED EMBODIMENTS

An electric sliding door apparatus for a vehicle according to one embodiment of the present invention will now be described.

Figure 1:
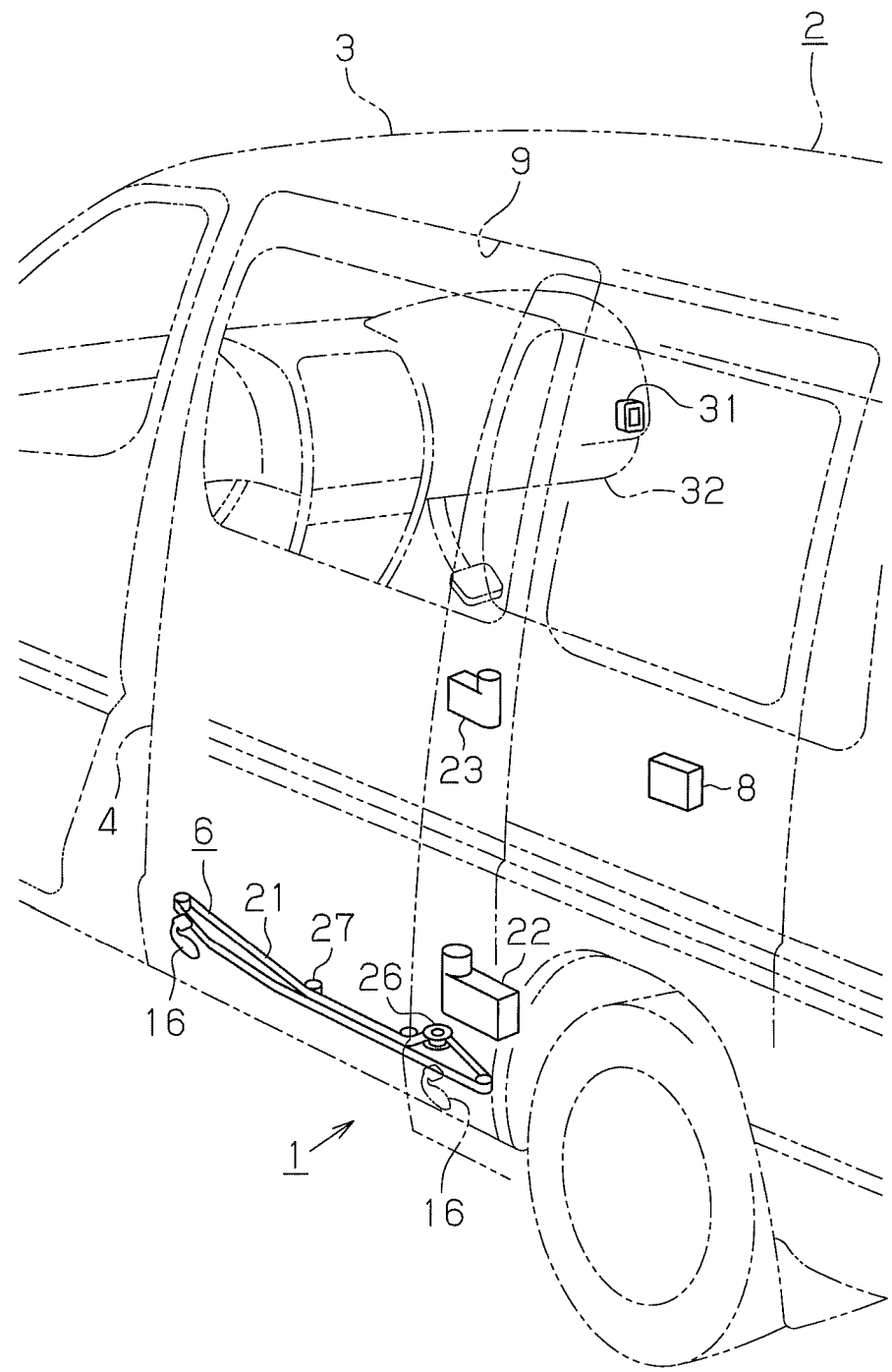
FIG. 1 is a perspective view showing a vehicle provided with an electric sliding door apparatus showing an embodiment obtained by embodying the present invention.
Figure 2:
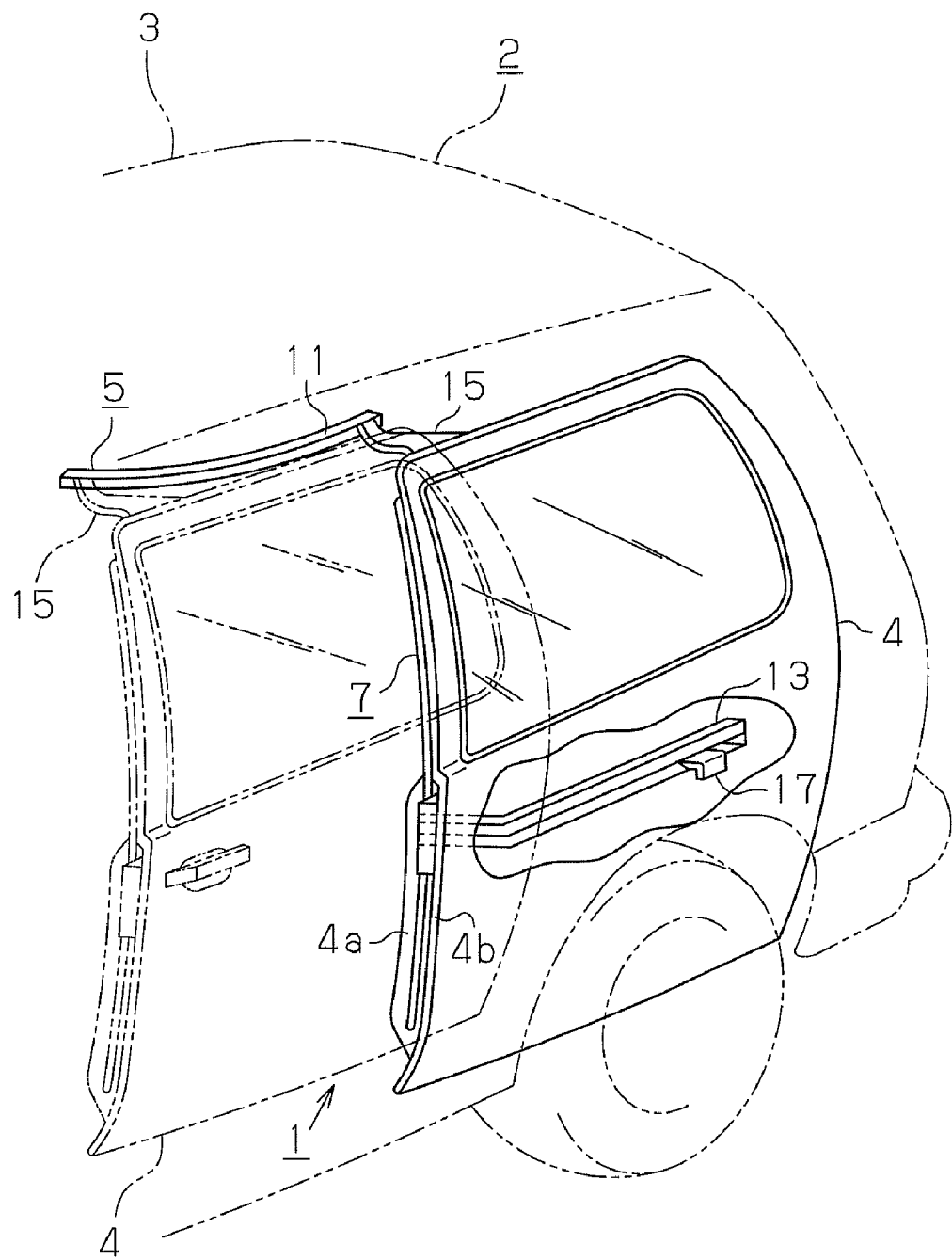
FIG. 2 is a perspective view of the vehicle in FIG. 1.

FIGS. 1 and 2 shows a vehicle 2 provided with an electric sliding door apparatus 1 serving as an opening and closing apparatus. The electric sliding door apparatus 1 is provided with a vehicle body 3, a door panel 4, an actuating mechanism 5, a driving mechanism 6, a foreign material detecting portion 7, and a control circuit 8. The vehicle body 3 serving as an opening forming body and the door panel 4 serving as a movable body are formed by a conductive metal. An door opening 9 serving as an opening portion opened and closed by the door panel 4 is formed in a side surface in a left side of the vehicle body 3. The door panel 4 is formed approximately in a rectangular shape in correspondence to the door opening 9, and is attached to the vehicle body 3 via the actuating mechanism 5 in such a manner as to be movable approximately in a longitudinal direction, for opening and closing the door opening 9. In other words, the door panel 4 is movable in a forward direction corresponding to a closing direction, and a backward direction corresponding to an opening direction opposite to the closing direction, for opening and closing the opening portion (9).

Figure 3:
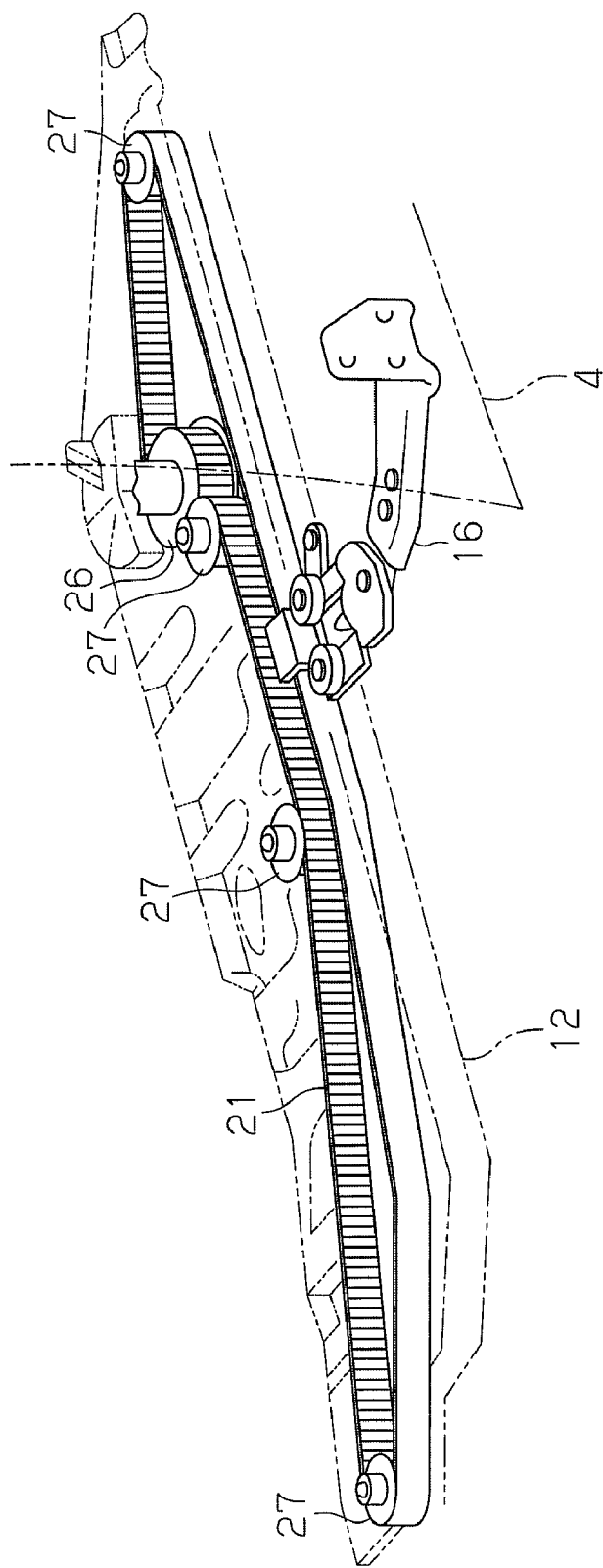
FIG. 3 is a perspective view showing the door panel driving mechanism shown in FIG. 1.

As shown in FIGS. 2 and 3, the actuating mechanism 5 is constituted by an upper rail 11, a lower rail 12 and a center rail 13, which are provided in the vehicle body 3, and an upper arm 15, a lower arm 16 and a center arm 17, which are provided in the door panel 4.

The upper rail 11 and the lower rail 12 are respectively provided in an upper portion and a lower portion of the door opening 9 in the vehicle 2, and extend approximately along a longitudinal direction of the vehicle 2. The center rail 13 is provided approximately in a center portion at the rear of the door opening 9 in the vehicle 2, and extends approximately along the longitudinal direction of the vehicle 2. Each of the rails 11 to 13 is formed so as to be along the longitudinal direction of the vehicle 2, and is bent such that a front portion is headed for an inner side of a passenger compartment.

The arms 15 to 17 are respectively fixed to an upper portion, a lower portion, and a center portion in a side surface within the passenger compartment of the door panel 4. The upper arm 15 is coupled to the upper rail 11, the lower arm 16 is coupled to the lower rail 12, and the center arm 17 is coupled to the center rail 13, respectively. The respective arms 15 to 17 are guided by the respective rails 11 to 13, and are movable in the longitudinal direction of the vehicle 2.

As shown in FIGS. 1 and 3, the driving mechanism 6 is provided with an endless belt 21, a slide actuator 22, a closure actuator 23 and a position detector 24 (refer to FIG. 7), and is controlled by the control circuit 8. The control circuit 8 is arranged in the door panel 4, and receives electric power from a battery 25 (refer to FIG. 7) in the vehicle 2.

As shown in FIG. 3, a drive pulley 26 rotating around a shaft extending in a vertical direction of the vehicle 2 and a plurality of driven pulleys 27 are provided adjacent to the lower rail 12, and the endless belt 21 is wound around the drive pulley 26 and the driven pulley 27. A distal end portion of the lower arm 16 is fixed to the endless belt 21. Further, if the endless belt 21 is rotated, the lower arm 16 is moved along the lower rail 12, and the door panel 4 is slid in the longitudinal direction.

As shown in FIG. 1, the slide actuator 22 is coupled to the drive pulley 26. The slide actuator 22 is structured such as to be provided with a slide motor 28 (refer to FIG. 7), and a speed reduction mechanism (not shown) decelerating a rotation of the slide motor 28. The slide motor 28 is rotated in response to a drive signal input from the control circuit 8. The rotation of the slide motor 28 is decelerated by the speed reduction mechanism, and is transmitted to the drive pulley 26 from an output shaft (not shown) of the slide actuator 22.

The closure actuator 23 is arranged in the door panel 4. The closure actuator 23 is structured such as to be provided with a closure motor 29 (refer to FIG. 7), and a speed reduction mechanism (not shown) decelerating a rotation of the closure motor 29. The door panel 4 is provided with a lock mechanism (not shown) such as a latch. The lock mechanism locks the door panel 4 immovably in a state in which the door panel 4 closes the door opening 9 (in a state in which the door panel 4 is arranged at a full-close position). The closure motor 29 is rotated in response to a drive signal input from the control circuit 8 in the case that the door panel 4 is positioned near the full-close position, and moves the door panel 4 to a position at which the door panel 4 can be locked by the lock mechanism as well as actuating the lock mechanism.

As shown in FIG. 7, the position detector 24 is provided in any one of a rotary shaft (not shown) of the slide motor 28, an output shaft (not shown) of the slide actuator 22, and a speed reduction gear (not shown) arranged between the slide motor 28 and the slide actuator 22. The position detector 24 detects a rotational amount of any one of the rotary shaft, the output shaft and the speed reduction gear from a drive starting time point of the slide motor 28. The position detector 24 outputs a position detecting signal in correspondence to the detected rotational amount to the control circuit 8. The control circuit 8 detects a sliding amount of the door panel 4, that is, a position of the door panel 4 (the lower arm 16) on the basis of the input position detecting signal. The position detector 24 is constituted, for example, by a magnet rotating together with any one of the rotary shaft, the output shaft and the speed reduction gear, and a Hall element arranged so as to oppose to the magnet.

An operation switch 31 is electrically connected to the control circuit 8. The operation switch 31 is arranged in a dashboard 32 (refer to FIG. 1). If the operation switch 31 is operated by a passenger so as to open the door opening 9, an opening signal for sliding the door panel 4 so as to open the door opening 9 is input to the control circuit 8 from the operation switch 31. If the opening signal is input, the control circuit 8 outputs a driving signal for opening the door panel 4 to the slide motor 28.

Further, if the operation switch 31 is operated by the passenger so as to close the door opening 9, a closing signal for sliding the door panel 4 so as to close the door opening 9 is input to the control circuit 8 from the operation switch 31. If the closing signal is input, the control circuit 8 outputs a driving signal for closing the door panel 4 to the slide motor 28. If the door panel 4 is actuated so as to be closed, and half latch detecting means detects that the lock mechanism comes to a half latch state, the control circuit 8 outputs the driving signal to the closure motor 29.

Figure 4:
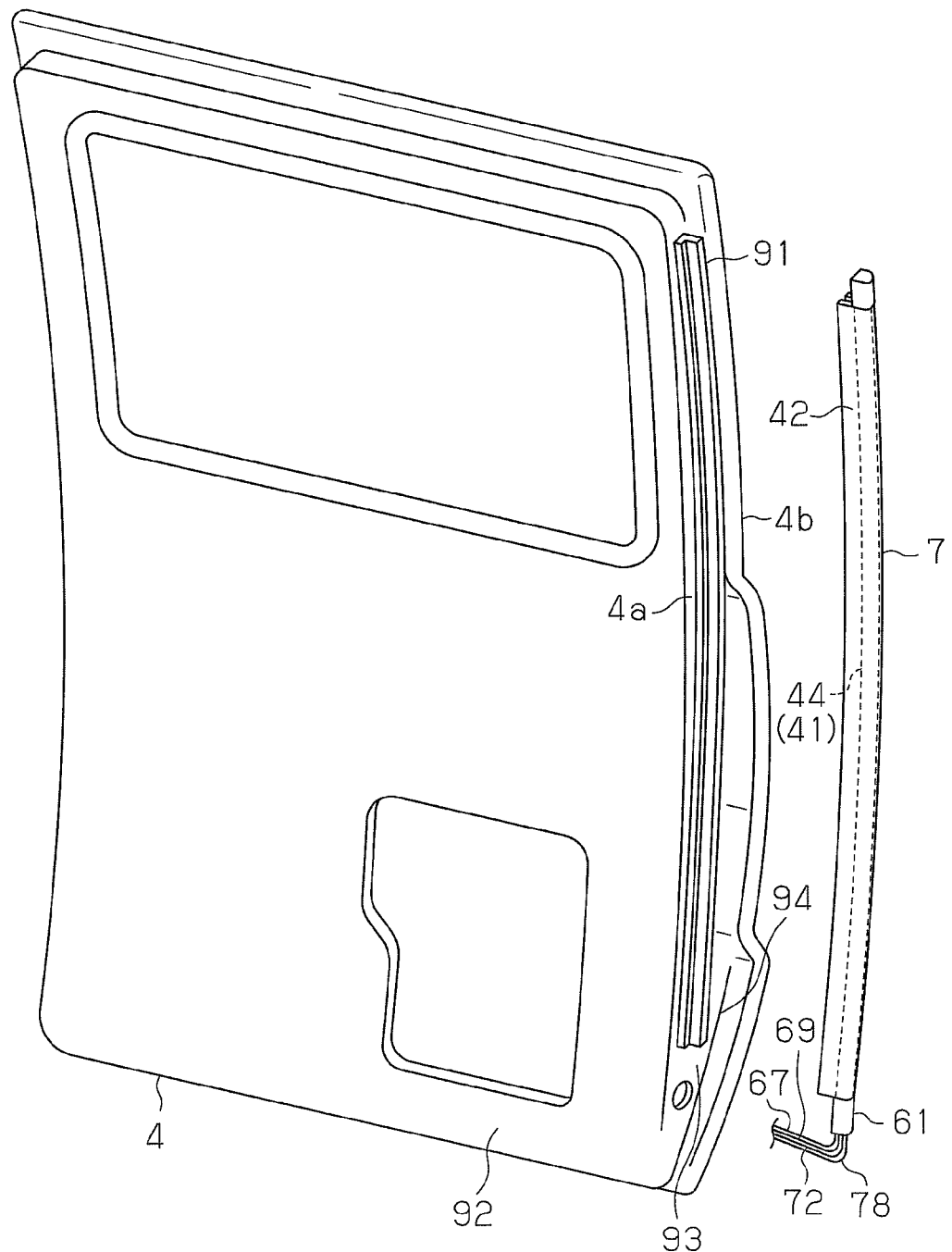
FIG. 4 is a perspective view showing the door panel in FIG. 1 and a sensor attached to the door panel.

As shown in FIG. 4, the foreign material detecting portion 7 is structured such as to be provided with a foreign material sensor 41 and a protector 42. The foreign material detecting portion 7 detects a first foreign material 110 (an object-to-be detected) between the door panel 4 and the vehicle body 3 at a time when the door panel 4 is slid in a direction of closing the door opening 9.

Figure 6A:
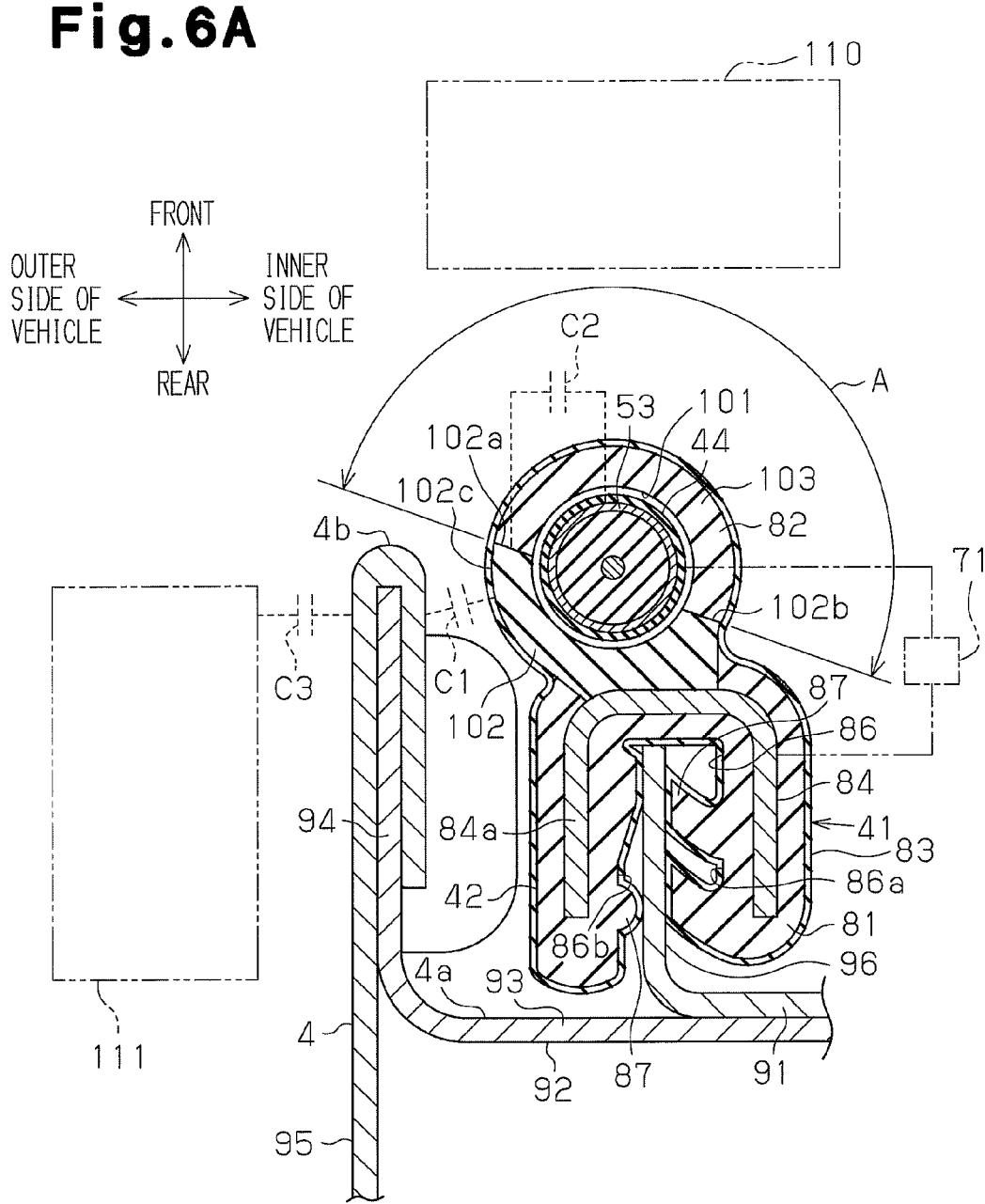
FIG. 6A is a cross-sectional view of the sensor in FIG. 5.

As shown in FIGS. 6A and 7, the foreign material sensor 41 is structured such as to be provided with a sensor main body 44, a capacitance detector 45, and a current detecting element 46, and is controlled by the control circuit 8.

Figure 6B:
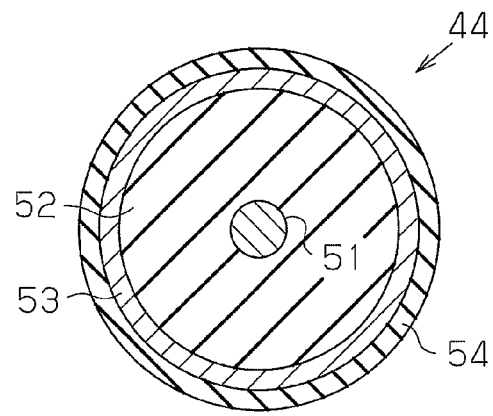
FIG. 6B is a cross-sectional view of the sensor main body in FIG. 6A.

As shown in FIG. 6A, the long sensor main body 44 is arranged along a front side portion in a forward moving direction at a time of the closing motion, that is, a front edge portion 4a of the door panel 4, in a peripheral edge portion of the door panel 4. In other words, the sensor main body 44 is arranged in the front edge portion 4a positioned in a front side in the closing direction of the door panel 4. The sensor main body 44 is formed in a coaxial cable shape. In more detail, as shown in FIG. 6B, the sensor main body 44 is provided with a columnar core electrode 51, a cylindrical piezoelectric rubber 52 coaxially arranged with the core electrode 51 in a peripheral surface of the core electrode 51, and a cylindrical sensor electrode 53 coaxially arranged with the core electrode 51 in an outer peripheral surface of the piezoelectric rubber 52. An outer peripheral surface of the sensor electrode 53 is coated by an outer skin 54 made of an insulating body.

Figure 5:
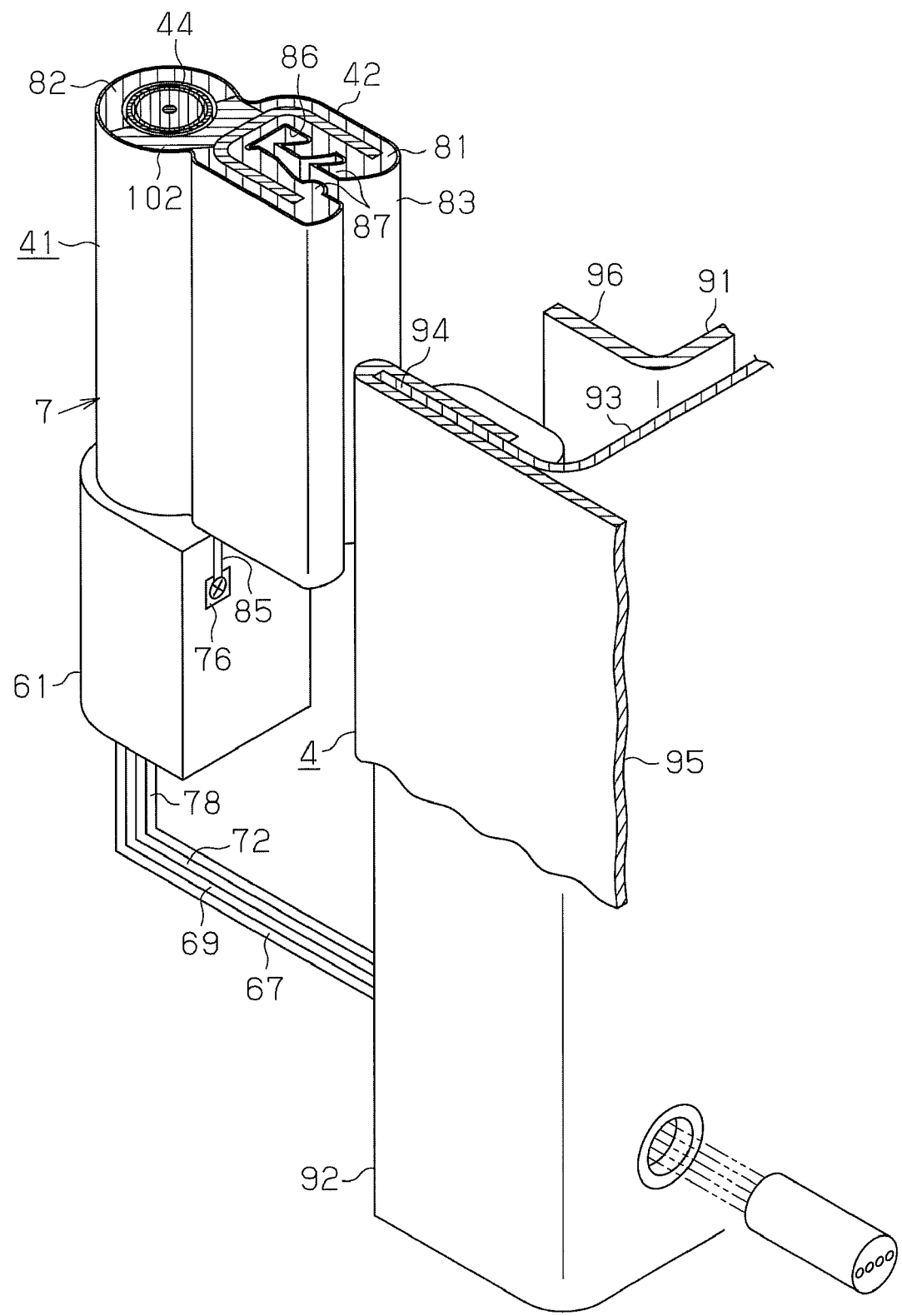
FIG. 5 is a perspective view showing the sensor shown in FIG. 4 and a circuit accommodating portion.
Figure 8:
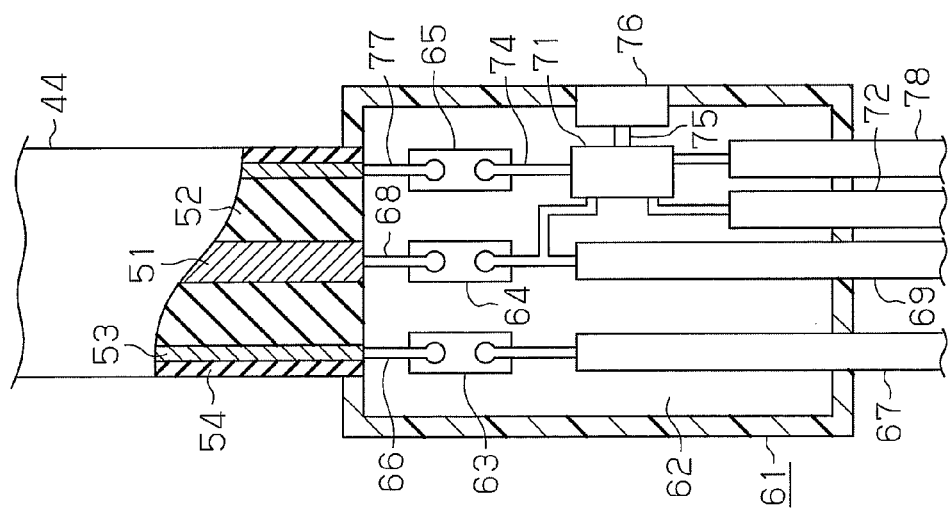
FIG. 8 is a cross-sectional view showing an internal structure of the circuit accommodating portion in FIG. 5.

As shown in FIG. 4, an upper end of the sensor main body 44 is molded by resin. Further, as shown in FIG. 5, a circuit accommodating portion 61 is integrally provided in a lower end of the sensor main body 44. As shown in FIG. 8, the circuit accommodating portion 61 serving as a terminal treatment portion accommodates a plate member 62. The rectangular plate member 62 is somewhat larger than a diameter of the sensor main body 44. A first metal piece 63, a second metal piece 64, and a third metal piece 65 are arranged on the plate member 62. The sensor electrode 53 is connected to the capacitance detector 45 via a first electric wire 66, the first metal piece 63 and a first lead wire 67 in sequence. The core electrode 51 is connected to a ground GND via a second electric wire 68, the second metal piece 64 and a second lead wire 69 in sequence.

A buffer amplifier 71 serving as a circuit device is arranged on the plate member 62. The buffer amplifier 71 is connected to the ground GND by the second lead wire 69, and receives an electric power by a third lead wire 72. An input terminal 74 of the buffer amplifier 71 is connected to the sensor electrode 53 via the third metal piece 65 and a third electric wire 77 in sequence. The buffer amplifier 71 is electrically connected to the current detecting element 46 via a fourth lead wire 78. An output terminal 75 of the buffer amplifier 71 is connected to a terminal 76 provided in an outer peripheral surface of the circuit accommodating portion 61.

As shown in FIG. 7, the capacitance detector 45 and the current detecting element 46 are electrically connected to the control circuit 8. The control circuit 8 supplies an electric current to the sensor electrode 53.

End portions of the first electric wire 66, the second electric wire 68, the third electric wire 77, the first lead wire 67 and the second lead wire 69 are connected to the corresponding one of the first metal piece 63, the second metal piece and the third metal piece 65, for example, through resistance welding. The plate member 62 is resin molded together with each of the members arranged on the plate member 62 and an end portion of the sensor main body 44.

As shown in FIG. 7, the capacitance detector 45 and the sensor electrode 53 form a non-contact type detecting portion 47 capable of detecting the first foreign material 110 existing between the door panel 4 and the vehicle body 3. The capacitance detector 45 is driven by the control circuit 8, and outputs a capacitance detecting signal to the control circuit 8 by detecting the change of the capacitance between the sensor electrode 53 and the ground GND.

The current detecting element 46, the core electrode 51, the piezoelectric rubber 52, and the sensor electrode 53 form a contact type detecting portion 50 coming into contact with the first foreign material 110 existing between the door panel 4 and the vehicle body 3 so as to detect the first foreign material 110. The current detecting element 46 can detect an electric current flowing between the sensor electrode 53 and the core electrode 51, and is arranged within the door panel 4. If a pressing force is applied to the sensor main body 44 from an external portion, that is, if the pressing force is applied to the piezoelectric rubber 52, a resistance value of the piezoelectric rubber 52 is changed, and the electric current flows between the sensor electrode 53 and the core electrode 51. The current detecting element 46 detects the current, and outputs a current detecting signal to the control circuit 8. In this case, the structure shown in FIG. 7 and the operation achieved by the structure are shown as one example, and can be appropriately changed.

As shown in FIG. 6A, the protector 42 serving as a support member holds the sensor main body 44, and fixes the sensor main body 44 to the door panel 4. The protector 42 is provided with a mounting portion 81, and a holding portion 82 integrally formed in the mounting portion 81. An outer peripheral surface of the protector 42 is coated by an insulating coating 83 made of silicon or the like.

The mounting portion 81 is formed by an insulative resin material including an elastomer or a rubber, and can be elastically deformed. A dimension in a longitudinal direction (a dimension in a vertical direction) of the mounting portion 81 is approximately equal to a dimension in an axial direction of the sensor main body 44. The mounting member 81 is provided with a frame member 84 reinforcing the mounting portion 81 and having a U-shaped cross section in an inner portion. The frame member 84 made of a conductive material such as a metal or the like is provided with a plurality of frame member main bodies 84a coupled to each other along a longitudinal direction of the mounting portion 81. As shown in FIG. 5, a fifth electric wire 85 serving as a connecting member is electrically connected to a lower end of the frame member 84. The mounting portion 81 has a mounting groove 86 positioned in an inner side of the frame member main body 84a. The mounting groove 86 extends along a longitudinal direction of the mounting portion 81, and is open to an opposite side to the holding portion 82. In other words, the mounting portion 81 is formed in a U-shaped cross-sectional form. The mounting groove 86 is defined by a first surface 86a and a second surface 86b opposing to each other. Every two pinching pieces 87 protrude from one of the first surface 86a and the second surface 86b toward the other, that is, totally four pinching pieces 87 protrude.

As shown in FIGS. 5 and 6A, the door panel 4 is provided with an inner plate 92 in an inner side of the vehicle, and an outer plate 95 in an outer side of the vehicle. A front portion of the inner plate 92 is bent, and is provided with a fixed portion 93 (a front edge portion 4a) heading for a front side of the vehicle, and an extended portion 94 extending to the front side of the vehicle from the fixed portion 93. A front portion of the outer plate 95 is folded back so as to pinch the extended portion 94. A long bracket 91 is fixed to the fixed portion 93. The bracket 91 having an L-shaped cross section has a pinched portion 96 extending toward the front side of the vehicle. In a state in which the bracket 91 is mounted to the fixed portion 93, the extended portion 94 protrudes to the front side of the vehicle, compared with the pinched portion 96.

In order to fix the protector 42 to the door panel 4, the mounting portion 81 is attached to the bracket 91. In other words, the pinched portion 96 moves forward into the mounting groove 86 by positioning the mounting groove 86 to the pinched portion 96 and pressing the protector 42 toward the bracket 91. A plurality of pinching pieces 87 are pressed by the pinched portion 96 so as to be elastically deformed, and pinch the pinched portion 96 on the basis of an elastic force. As mentioned above, the mounting portion 81 pinches the pinched portion 96, whereby the protector 42 is fixed to the door panel 4.

As shown in FIG. 6A, the holding portion 82 is formed in a cylindrical shape having an insertion hole 101. A dimension in an axial direction of the holding portion 82 is equal to a dimension in the longitudinal direction of the mounting portion 81. A diameter of the insertion hole 101 is somewhat larger than a diameter of the columnar sensor main body 44. The holding portion 82 has a guard electrode 102 and a contact portion 103.

The guard electrode 102 is formed by a conductive resin material including an elastomer or a rubber, and can be elastically deformed. The guard electrode 102 is integrally formed in a bottom portion of the mounting portion 81 formed in the U-shaped form, and is brought into contact with the frame member 84. The guard electrode 102 is formed in a semicircular arc cross-sectional shape, and is open to an opposite side to the mounting portion 81. A first end surface 102a in an outer side of the vehicle (a side corresponding to an outer plate 95) of the guard electrode 102 is positioned in a front side of the vehicle than a front end 4b (a front end of the outer plate 95) of the door panel 4. Further, a second end surface 102b in an inner side of the vehicle (a far side from the outer plate 95) of the guard electrode 102 is positioned rearward of the first end surface 102a in the vehicle 2.

The contact portion 103 is formed by the insulative resin material including the elastomer or the rubber, and can be elastically deformed. The contact portion 103 formed in a semicircular arc cross-sectional shape is open toward the guard electrode 102. The contact portion 103 is integrally formed with the guard electrode 102. In other words, the integrally formed guard electrode 102 and contact portion 103 form the cylindrical holding portion 82.

The protector 42 having the structure mentioned above, that is, the guard electrode 102 and the contact portion 103, are formed by an extrusion molding. An outer peripheral surface (except an inner peripheral surface of the insertion hole 101) of the protector 42 is coated by the insulating coating 83. In other words, an outer surface 102c (a portion exposed to the exterior of the protector 42) of the guard electrode 102 is covered with the insulating coating 83. The sensor main body 44 is inserted into the insertion hole 101 of the holding portion 82. The sensor main body 44 is inserted into the insertion hole 101 from an upper end which is not provided with the circuit accommodating portion 61). As shown in FIG. 5, the fifth electric wire 85 extending from the frame member 84 to a lower side of the protector 42 is screwed to the terminal 76 of the circuit accommodating portion 61. Accordingly, the output terminal 75 of the buffer amplifier 71 is electrically connected to the guard electrode 102 via the terminal 76, the fifth electric wire 85 and the frame member 84 in sequence. As shown in FIG. 8, the input terminal 74 of the buffer amplifier 71 is connected to the sensor electrode 53 via the third metal piece 65 and the third electric wire 77. Accordingly, the sensor electrode 53 is electrically connected to the guard electrode 102 via the buffer amplifier 71. The buffer amplifier 71 keeps the guard electrode 102 at the same voltage (electric potential) as the sensor electrode 53.

As shown in FIG. 6A, in a state in which the sensor main body 44 is inserted into the insertion hole 101, the protector 42 is fixed to the bracket 91. In a state in which the sensor main body 44 is attached to the door panel 4 by the protector 42, the sensor main body 44 protrudes frontward in the vehicle 2, compared with the front end 4b of the door panel 4. Further, since the first end surface 102a in the outer side of the vehicle of the guard electrode 102 is positioned in a forward side of the vehicle 2 than the front end 4b of the door panel 4, the guard electrode 102 is arranged between the door panel 4 and the sensor main body 44, that is, between the outer plate 95 and the sensor electrode 53.

The guard electrode 102 is kept at the same voltage as the sensor electrode 53. If a second foreign material 111 comes close to the sensor electrode 53 in a state in which the guard electrode 102 exists between the second foreign material 111 and the sensor electrode 53, a first stray capacitance C1 corresponding to an capacitance between the guard electrode 102 and the door panel 4 is changed. However, the capacitance change does not exert an influence on the capacitance detected by the sensor electrode 53. A portion of the sensor electrode 53 opposing to the guard electrode 102 in a radial direction, that is, a rear semicircular arc portion of the sensor electrode 53 covered with the guard electrode 102 form a dead zone. On the contrary, a portion of the sensor electrode 53 which does not oppose to the guard electrode 102 in the radial direction, that is, a front semicircular arc portion of the sensor electrode 53 opposing to the contact portion 103 in the radial direction forms a detectable range A which can detect the change of the capacitance caused by the approach of the first foreign material 110. The detectable range A of the guard electrode 102 is set such that it can detect the first foreign material 110 existing in the front side in the forward moving direction at a time of closing the door panel 4. The detectable range A in accordance with the present embodiment is expanded to the front side of the vehicle of the door panel 4.

Next, a description will be given of an operation of the foreign material detecting portion 7 at a time of closing the door panel 4.

If the closing signal is input from the operation switch 31, the control circuit 8 outputs the driving signal to the slide motor 28 and actuates so as to close the door panel 4. At the same time, the control circuit 8 drives the foreign material sensor 41.

A description will be given of an operation of the non-contact type detecting portion 47 with reference to FIG. 6A. If the conductive first foreign material 110 goes into the detectable range A during the sliding motion of the door panel 4, the capacitance detected by the sensor electrode 53 is changed. The capacitance detector 45 detects the change of the capacitance, and outputs the capacitance detecting signal to the control circuit 8. If the capacitance detecting signal is input, the control circuit 8 determines that the first foreign material 110 exists between the door panel 4 and the vehicle body 3, and outputs a stop signal for stopping the door panel 4 to the slide motor 28. As a result, the door panel 4 is stopped.

Describing in detail, the guard electrode 102 is arranged between the door panel 4 (the outer plate 95) and the sensor main body 44 (the sensor electrode 53). Accordingly, it is possible to prevent the stray capacitance from being directly generated between the sensor electrode 53 and the door panel 4, the first stray capacitance C1 is generated between the door panel 4 and the guard electrode 102, and the second stray capacitance C2 is generated between the guard electrode 102 and the sensor electrode 53.

If the second foreign material 111 comes close to the door panel 4 from the outer side of the door panel 4, a third stray capacitance C3 is generated between the second foreign material 111 and the door panel 4. The third stray capacitance C3 is coupled to the first stray capacitance C1 in parallel via the door panel 4.

However, in the present embodiment, the voltage of the guard electrode 102 is kept at the same voltage as the voltage of the sensor electrode 53. Accordingly, even if the first stray capacitance C1 between the guard electrode 102 and the door panel 4 is coupled to the third stray capacitance C3 in parallel, the second stray capacitance C2 between the guard electrode 102 and the sensor electrode 53 is not affected. Accordingly, the capacitance detected by the sensor electrode 53 is not changed even if the second foreign material 111 comes close to the door panel 4 from the outer side of the door panel 4. Accordingly, it is possible to prevent an erroneous detection (an erroneous determination) on the basis of an existence of the second foreign material 111 between the door panel 4 and the vehicle body 3.

If the first foreign material 110 between the door panel 4 and the vehicle body 3 is detected by the non-contact type detecting portion 47, the control circuit 8 is not limited to stop the slide motor 28, but may be structured such as to decelerate the slide motor 28 or draw the passenger's attention. In the case mentioned above, there is a case that the contact type detecting portion 50 detects the first foreign material 110. If the first foreign material 110 is pinched between the door panel 4 during the sliding motion and the vehicle body 3 (the door opening 9), that is, if the first foreign material 110 comes into contact with the front edge portion 4a of the door panel 4, the holding portion 82 is elastically deformed, and the sensor main body 44 receives the pressing force from the first foreign material 110. If the piezoelectric rubber 52 is deformed by the pressing force, a resistance value of the piezoelectric rubber 52 is changed, and the electric current flows between the sensor electrode 53 and the core electrode 51. The current detecting element 46 detects the current, and outputs the current detecting signal to the control circuit 8. Accordingly, the control circuit 8 determines that the first foreign material 110 is pinched between the door panel 4 and the vehicle body 3, and outputs a driving signal for moving the door panel 4 to the full-open position to the slide motor 28. As a result, the door panel 4 is slid to the full-open position.

The control circuit 8 detects the position of the door panel 4 (the lower arm 16) on the basis of the position detecting signal input from the position detector 24. If the control circuit 8 detects that the door panel 4 slides within a range of a predetermined distance from the full-close position (for example, 3 to 5 cm before the full-close position), the control circuit 8 invalidate the capacitance detecting signal even in the case that the capacitance detecting signal is input from the capacitance detector 45. In other words, in the case that the door panel 4 comes close to the full-close position, the control circuit 8 cancels the foreign material detection by means of the non-contact type detecting portion 47, and detects the first foreign material 110 on the basis of only the current detecting signal from the current detecting element 46 corresponding to the contact type detecting portion 50.

As mentioned above, the present embodiment has the following advantages.

(1) The guard electrode 102 is arranged between the sensor main body 44 and the door panel 4. The guard electrode 102 is kept at the same voltage as the sensor electrode 53 by the buffer amplifier 71. Accordingly, the portion of the sensor electrode 53 opposing to the guard electrode 102 forms the dead zone which cannot detect the change of the capacitance. Therefore, even if the second foreign material 111 comes close to the door panel 4 from the outer side of the door panel 4, it is possible to prevent the capacitance detected by the sensor electrode 53 from being changed by the third stray capacitance C3. In other words, it is possible to prevent the erroneous detection that the second foreign material 111 exists between the door panel 4 and the vehicle body 3, even if the second foreign material 111 comes close to the door panel 4 from the outer side of the door panel 4. The erroneous detection preventing mechanism is achieved by a simple structure obtained only by setting the guard electrode 102, and keeping the guard electrode 102 at the same voltage as the sensor electrode 53 by the buffer amplifier 71.

For example, in the case of only the contact type detecting portion 50 (a pressure sensitive switch or the like), the existence of the first foreign material 110 is detected only after the first foreign material 110 comes into contact with the contact type detecting portion 50. Accordingly, a long time is required until the door panel 4 is opened after the first foreign material 110 gets into the portion between the door panel 4 and the vehicle body 3. Further, a load is applied to the slide motor 28. Accordingly, it is desirable to use the capacitance type foreign material sensor 41 capable of detecting the first foreign material 110 in a non-contact manner.

(2) The guard electrode 102 is provided in the protector 42 for fixing the sensor main body 44 to the door panel 4. Accordingly, the protector 42 easily fixes the guard electrode 102 to the door panel 4 by fixing the sensor main body 44 to the door panel 4 by the protector 42. Further, since the guard electrode 102 forms a part of the holding portion 82 holding the sensor main body 44, the guard electrode 102 is easily arranged between the sensor electrode 53 and the door panel 4. Further, since the guard electrode 102 forms a part of the holding portion 82, the guard electrode 102 is arranged close to the sensor electrode 53. Accordingly, it is easy to electrically connect the sensor electrode 53 and the guard electrode 102. As a result, it is possible to reduce the manufacturing costs of the electric sliding door apparatus 1.

(3) The mounting portion 81 is formed by the insulative resin material. The mounting portion 81 is integrally formed in the holding portion 82, and the holding portion 82 has the guard electrode 102. Accordingly, the mounting portion 81 can easily insulate the guard electrode 102 from the door panel 4.

(4) The guard electrode 102 forms a part of the holding portion 82 holding the sensor main body 44. Accordingly, it is possible to easily regulate the detectable range A of the first foreign material 110 by regulating the mode of the holding portion 82.

(5) In the constituting elements of the protector 42, the mounting portion 81 and the contact portion 103 are formed by the insulative resin material, and the guard electrode 102 is formed by the conductive resin material. Accordingly, it is possible to easily form the protector 42 provided with the guard electrode 102 for preventing the erroneous detection of the non-contact type detecting portion 47, for example, through extrusion molding. In other words, it is possible to shorten the manufacturing time and reduce the manufacturing costs of the protector 42.

(6) The fifth electric wire 85 is connected to the frame member 84, and the fifth electric wire 85 extends outward from the lower end portion of the protector 42. It is possible to easily connect the guard electrode 102 to the buffer amplifier 71 only by screwing the fifth electric wire 85 to the terminal 76 of the circuit accommodating portion 61. As a result, it is possible to prevent the sensor main body 44 and the protector 42 from having a complicated structure for setting the voltage of the guard electrode 102.

(7) The core electrode 51, the piezoelectric rubber 52 and the sensor electrode 53 constituting the contact type detecting portion 50 are formed in a coaxial cable shape. Accordingly, it is not necessary to consider the direction of the sensor main body 44 at a time of attaching the sensor main body 44 to the protector 42. This facilitates the assembly of the contact type detecting portion 50 with respect to the protector 42 and the door panel 4. Further, since the sensor main body 44 is formed in a coaxial cable shape, it is possible to ensure the foreign material detecting performance of the contact type detecting portion 50 even if the sensor main body 44 is attached to the door panel 4 in the curved state. Accordingly, it is possible to increase a freedom of the arranged position of the sensor main body 44.

(8) The sensor main body 44 protrudes further forward than the door panel 4 in the vehicle 2. In other words, the sensor main body 44 protrudes further forward than the front end 4b of the door panel 4 in the moving direction at a time of closing the door panel 4. Accordingly, the non-contact type detecting portion 47 can more quickly detect the first foreign material 110 between the door panel 4 and the vehicle body 3. Since the contact portion 103 of the contact type detecting portion 50 comes into contact with the first foreign material 110 before the door panel 4, the contact portion 103 can more quickly detect the first foreign material 110.

(9) The outer surface 102c of the guard electrode 102 is covered with the insulating coating 83. Accordingly, it is possible to prevent the first foreign material 110, the second foreign material 111 and the like from coming into contact with the guard electrode 102. In other words, it is possible to insulate the guard electrode 102 from the first foreign material 110 and the second foreign material 111 by the insulating coating 83.

The embodiment mentioned above may be modified as follows.

In the embodiment mentioned above, the foreign material sensor 41 is provided with both of the non-contact type detecting portion 47 of the capacitance type, and the contact type detecting portion 50, however, the structure is not limited to this, but may be provided only with the non-contact type detecting portion 47. However, if both of the non-contact type detecting portion 47 and the contact type detecting portion 50 are provided, it is possible to achieve a fail-safe function by detecting the foreign material by two systems. Further, it is possible to achieve various functions such as drawing the passenger's attention on the basis of the detection of the non-contact type detecting portion 47, and stopping and fully opening the door panel 4 on the basis of the detection of the contact type detecting portion 50.

In the embodiment mentioned above, the contact type detecting portion 50 is provided with the piezoelectric rubber 52, and the core electrode 51 and the sensor electrode 53 corresponding to a pair of electrodes pinching the piezoelectric rubber 52 therebetween. In other words, it is possible to detect the first foreign material 110 between the door panel 4 and the vehicle body 3 on the basis of the change of the resistance value of the piezoelectric rubber 52. However, the structure is not limited to this, but the contact type detecting portion 50 may be of a pressure sensitive switch type. For example, the foreign material sensor 41 has long first electrode and second electrode which are arranged so as to be spaced. One end of the first electrode is electrically connected to one end of the second electrode via a resistor, and supplies an electric current to the other end of the first electrode, and electrically connects the other end of the second electrode to the current detecting element 46. If the foreign material sensor 41 mentioned above comes into contact with the first foreign material 110 so as to receive the pressing force, the first electrode comes into contact with the second electrode, and the electric current flowing between both the electrodes is changed. Accordingly, it is possible to detect the change by the current detecting element 46.

In the embodiment mentioned above, the guard electrode 102 is formed by the conductive resin material, and forms a part of the holding portion 82 of the protector 42. However, the structure is not limited to this, but the guard electrode 102 may be constituted, for example, by a guard electrode 120 shown in FIGS. 9 and 10, as far as the guard electrode 102 is arranged between the sensor electrode 53 and the door panel 4.

Figure 9:
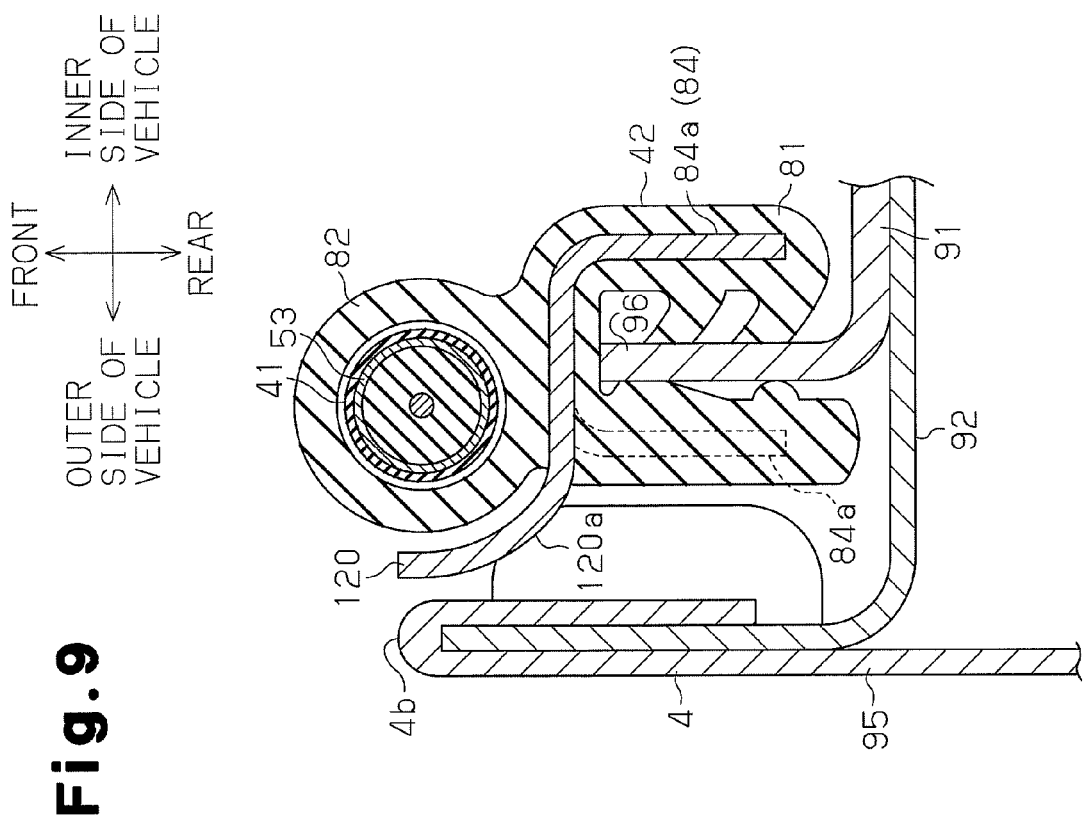
FIG. 9 is a cross-sectional view of a sensor in accordance with another embodiment of the present invention.
Figure 10:
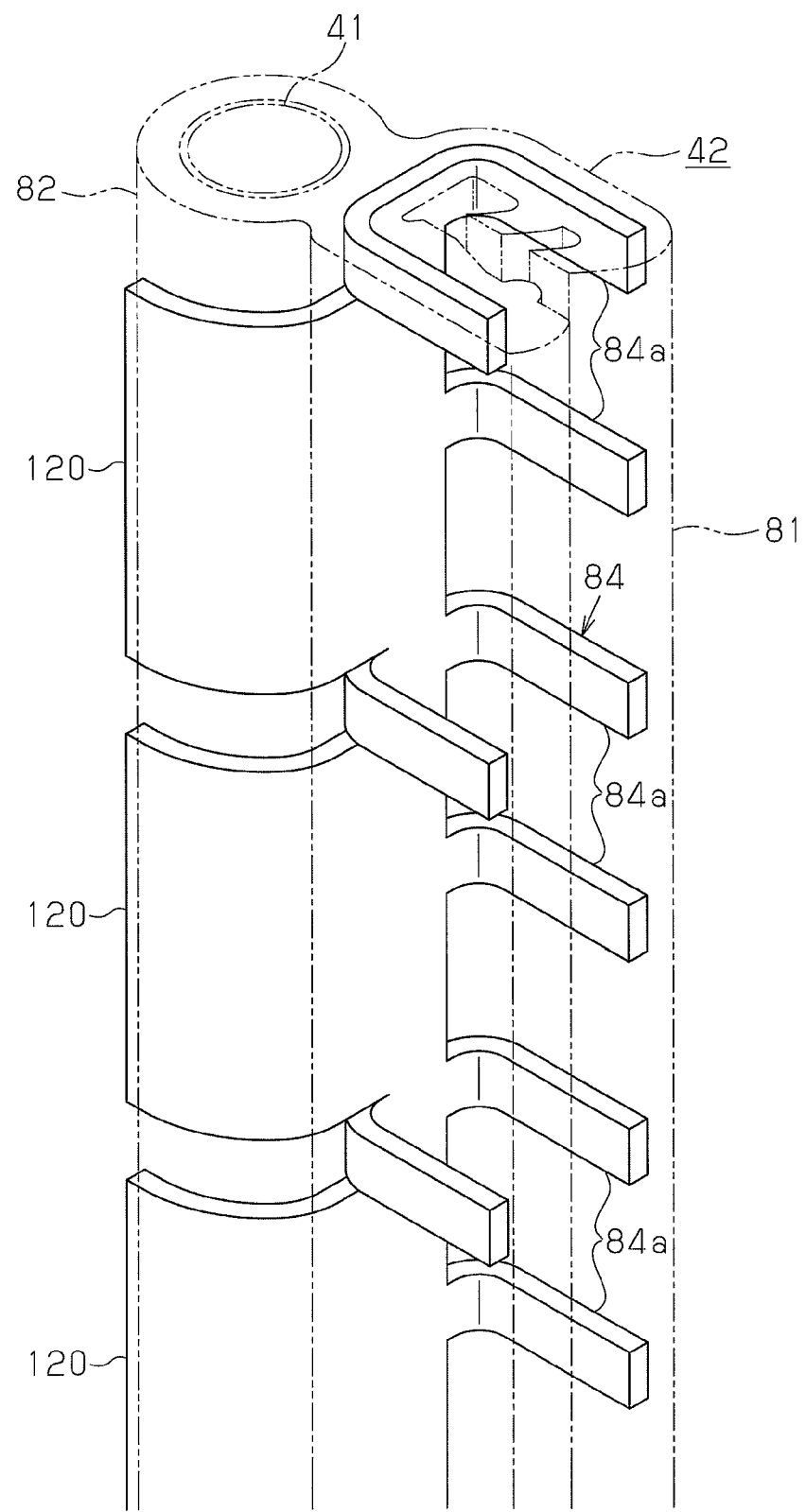
FIG. 10 is a perspective view showing a frame member in the sensor in FIG. 9.

The guard electrode shown in FIGS. 9 and 10 is constituted by the frame member 84. In detail, the frame member 84 is provided with a plurality of protruding portions, which extend toward the door panel 4, protrude out from the mounting portion 81, and are curved along the outer peripheral surface of the holding portion 82 (the outer peripheral surface of the sensor electrode 53). The protruding portion serves as the guard electrode 120. As shown by a solid line in FIG. 9, a cross section of the portion of the frame member 84 having the guard electrode 120 is formed approximately in an S-shaped form. The guard electrode 120 is arranged between the door panel 4 and the sensor electrode 53. In this case, it is possible to form the protector 42 by one kind of insulative resin material, and it is possible to reduce the manufacturing cost. It is possible to omit the insulating coating 83. Further, since a portion of the frame member 84 (the frame member main body 84a) corresponding to the constituting part of the protector 42 is utilized as the guard electrode 120, it is possible to prevent an increase in the number of parts even if the guard electrode 120 is provided, and it is possible to intend to further reduce the manufacturing costs.

Further, since the frame member 84 (the frame member main body 84a) is embedded in the mounting portion 81 made of the insulative resin material, it is possible to easily insulate the guard electrode 120 from the door panel 4. As a matter of course, an outer surface 120a (an exposed surface to the outer portion of the mounting portion 81) of the guard electrode 120 may be coated by the same insulating coating as the insulating coating 83.

In the embodiment mentioned above, the guard electrode 102 is electrically connected to the sensor electrode 53 via the buffer amplifier 71 by screwing the fifth electric wire 85 extending from the guard electrode 102 to the terminal 76 of the circuit accommodating portion 61. However, it is possible to electrically connect the guard electrode 102 to the sensor electrode 53 via the buffer amplifier 71 by structuring such that the terminal 76 pinches the fifth electric wire 85.

Figure 11:
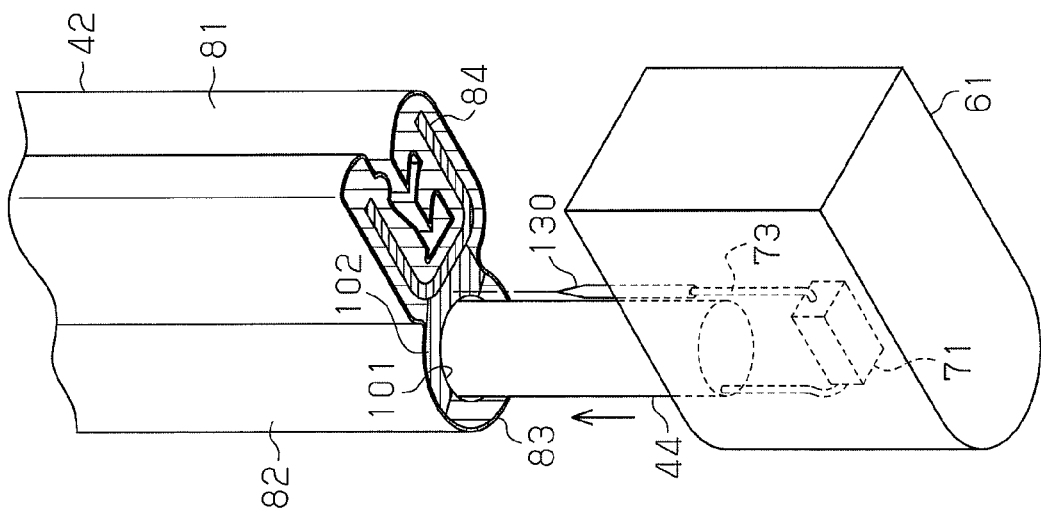
FIG. 11 is a perspective view showing a modified embodiment of a connection portion of the circuit accommodating portion with respect to a guard electrode.

Further, as shown in FIG. 11, a needle portion 130 may be provided in the circuit accommodating portion 61 in place of the terminal 76. The needle portion 130 is electrically connected to the output terminal 75 of the buffer amplifier 71. In accordance with the structure mentioned above, the needle portion 130 is inserted into the guard electrode 102 only by inserting the sensor main body 44 to the insertion hole 101. In other words, the guard electrode 102 can be electrically connected to the sensor electrode 53. As a result, it is possible to reduce the manufacturing costs.

Further, in FIG. 11, the needle portion 130 is provided in the circuit accommodating portion 61, however, the structure is not limited to this, but the needle portion 130 may be provided in the protector 42. The needle portion 130 is electrically connected to the guard electrode 102. In this case, the needle portion 130 is inserted into the circuit accommodating portion 61 by inserting the sensor main body 44 to the insertion hole 101. Accordingly, the guard electrode 102 is electrically connected to the sensor electrode 53 via the buffer amplifier 71.

Figure 12:
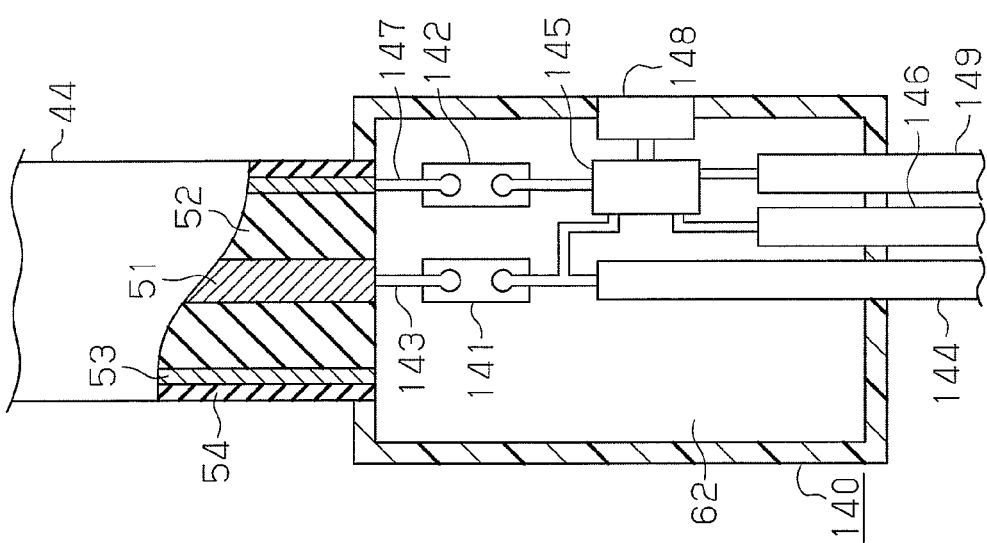
FIG. 12 is a cross-sectional view showing an internal structure of a circuit accommodating portion in accordance with another embodiment.

In place of the circuit accommodating portion 61 in accordance with the embodiment mentioned above, a circuit accommodating portion 140 shown in FIG. 12 may be employed. A first metal piece 141, a second metal piece 142 and a circuit portion 145 are arranged on a plate member 62 of the circuit accommodating portion 140. The core electrode 51 is connected to the ground GND via a first electric wire 143, the first metal piece 141 and a first lead wire 144. The circuit portion 145 is provided with the capacitance detector 45, the current detecting element 46 and the buffer amplifier 71. The circuit portion 145 receives a power via a second lead wire 146, and is connected to the ground GND via the first lead wire 144. The sensor electrode 53 is electrically connected to a terminal 148 via a second electrode 147, the second metal piece 142 and the circuit portion 145. If the guard electrode 102 is connected to the terminal 148, the guard electrode 102 is electrically connected to the sensor electrode 53 via the buffer amplifier 71 of the circuit portion 145. Accordingly, the buffer amplifier 71 keeps the guard electrode 102 at the same voltage as the sensor electrode 53. The circuit portion 145 is controlled by the control circuit 8 connected via a third lead wire 149. In this case, it is possible to reduce the number of the lead wires connected to the circuit accommodating portion 140.

In the embodiment mentioned above, the contact portion 103 is formed by the insulative resin material having elasticity, however, may be formed by a sponge corresponding to a porous insulative material.

If the first foreign material 110 between the door panel 4 and the vehicle body 3 is detected on the basis of the capacitance detecting signal, the control circuit 8 is not limited to stop the slide motor 28, but may be structured such as to decelerate the slide motor 28 or draw the passenger's attention. Further, in the embodiment mentioned above, when the current detecting signal is input from the contact type detecting portion 50 during the closing motion of the door panel 4, the control circuit 8 makes the slide motor 28 move the door panel 4 to the full-open position, however, the structure is not limited to this, but may be structured such as to stop the door panel 4.

In the embodiment mentioned above, the guard electrode 102 is kept at the same voltage as the sensor electrode 53 by the buffer amplifier 71. However, the structure is not limited to this, but may be made such as to keep a ratio between the voltage (the electric potential) of the guard electrode 102 and the voltage (the electric potential) of the sensor electrode 53 at a fixed value. To keep the voltage ratio at the fixed value means to control the voltage of the guard electrode 102 in correspondence to the voltage change of the sensor electrode 53 in such a manner that the ratio between the voltage of the sensor electrode 53 and the voltage of the guard electrode 102 becomes always constant. For example, the buffer amplifier 71 controls the voltage of the guard electrode 102 such that the ratio comes to a constant value, by using an electric potential difference of the sensor electrode 53 and the guard electrode 102 with respect to the ground GND, and calculating the ratio between the voltage of the sensor electrode 53 and the voltage of the guard electrode 102.

In the embodiment mentioned above, the foreign material sensor 41 is arranged in the front edge portion 4a of the door panel 4. However, for example, the foreign material sensor 41 may be arranged in the vehicle body 3. In this case, the foreign material sensor 41 may be arranged in a portion opposing to the front edge portion 4a in the peripheral edge portion of the door opening 9. In other words, the foreign material sensor 41 may be arranged in any one layout body of the door panel 4 and the vehicle body 3. Further, the foreign material sensor 41 is not limited to be arranged in the door panel 4 of the vehicle 2 or the peripheral edge portion of the door opening 9 opened and closed by the door panel 4, but may be arranged in any one of a backdoor of the vehicle 2, a peripheral edge portion of an opening portion opened and closed by the backdoor, a trunk door of the vehicle 2 and a peripheral edge portion of an opening portion opened and closed by the trunk door.

In the embodiment mentioned above, the protector 42 holding the sensor main body 44 is attached to the bracket 91 by inserting the pinched portion 96 to the mounting groove 86. However, the protector 42 may be directly attached to the door panel 4 in some shapes of the vehicle 2 (the door panel 4). For example, the front end 4b of the door panel 4 shown in FIG. 6A may be inserted into the mounting groove 86. In other words, the structure may be made such that the mounting portion 81 pinches the extended portion 94 of the inner plate 92. In this case, since it is possible to omit the bracket 91, the cost for mounting the electric sliding door apparatus to the vehicle 2 is reduced.

In the embodiment mentioned above, the mounting portion 81 of the protector 42 is formed by the insulative resin material. However, the mounting portion 81 may be formed by the same conductive resin material as the guard electrode 102. The insulating coating 83 insulates the sensor electrode 53 and the guard electrode 102 from the door panel 4. In this case, it is further easy to manufacture the protector 42, and it is possible to reduce a manufacturing cost of the protector 42.

What is claimed is:

1. An opening and closing apparatus comprising:
a conductive movable body which is movable in a closing direction and an opening direction opposite the closing direction so as to open and close an opening portion formed in a conductive opening forming body, the movable body having a front edge portion positioned in a front side in the closing direction of the movable body, and the opening portion having an opposing edge portion opposing to the front edge portion;
a sensor arranged in a layout body, which is one of the opening forming body and the movable body, the sensor being arranged in one of the front edge portion and the opposing edge portion, the sensor having a sensor electrode, and the sensor being capable of detecting a conductive object-to-be-detected on the basis of a change of a capacitance between the sensor electrode and the object-to-be-detected coming close to the sensor electrode;
a support member made of insulative resin material for fixing the sensor to the layout body, the support member having a frame member made of a conductive material;
a guard electrode supported by the frame member to be provided between the layout body and the sensor electrode, the guard electrode made of a conductive resin material being electrically connected to the sensor electrode and the frame member; and
a circuit device electrically connected to the gaurd electrode, wherein the circuit device controls a voltage of the guard electrode to keep an electric potential of the guard electrode equal to an electric potential of the sensor electrode or at a fixed rate with respect to the electric potential of the sensor electrode.

2. The opening and closing apparatus according to claim 1, wherein the support member is provided with a holding portion for holding the sensor, and a mounting portion for attaching the holding portion to the layout body, and wherein the holding portion has the guard electrode.

3. The opening and closing apparatus according to claim 1, wherein the guard electrode is integrally formed with the support member.

4. The opening and closing apparatus according to claim 1, wherein the frame member has a protruding portion protruding out from the mounting portion, and the protruding portion forms the guard electrode.

5. The opening and closing apparatus according to claim 1, further comprising a connection member electrically connected to the guard electrode, and the circuit device electrically connected to the connection member.

6. The opening and closing apparatus according to claim 5, wherein the sensor has an accommodating portion accommodating the circuit device, and
wherein the connection member includes a needle portion provided in one of the accommodating portion and the support member, and wherein, in a state in which the support member supports the sensor, the needle portion is inserted into the other of the accommodating portion and the support member.

7. The opening and closing apparatus according to claim 1, wherein the sensor is provided with a contact type detecting portion having a pair of conductive bodies, and the contact type detecting portion is capable of detecting the object-to-be-detected on the basis of a resistance value or a voltage value between the pair of conductive bodies which is changed in correspondence to a pressing force applied from the object-to-be-detected, and wherein the pair of conductive bodies are coaxially arranged with the sensor electrode.

8. The opening and closing apparatus according to claim 7, wherein the sensor is arranged in the movable body, and the contact type detecting portion protrudes forward from the movable body with respect to the closing direction.

9. The opening and closing apparatus according to claim 8, wherein one of the pair of conductive bodies also functions as the sensor electrode.

10. The opening and closing apparatus according to claim 1, wherein an insulating coating is formed on an outer surface of the guard electrode.

* * * * *

UNITED STATES PATENT AND TRADEMARK OFFICE
CERTIFICATE OF CORRECTION

PATENT NO. : 7,958,672 B2  
APPLICATION NO. : 11/815357  
DATED : June 14, 2011  
INVENTOR(S) : Hidenori Ishihara Page 1 of 1

It is certified that error appears in the above-identified patent and that said Letters Patent is hereby corrected as shown below:

Column 14, line 33, delete "gaurd" and insert therefor --guard--.

Signed and Sealed this  
Nineteenth Day of July, 2011

David J. Kappos  
*Director of the United States Patent and Trademark Office*